(12) United States Patent
Antesberger (10) Patent No.: US 8,309,928 B2
(45) Date of Patent: Nov. 13, 2012

(54) ALTERNATIVE PIXEL SHAPE FOR UNCOOLED MICRO-BOLOMETER

(75) Inventor: A. Wayne Antesberger, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 336 days.

(21) Appl. No.: 12/753,204

(22) Filed: Apr. 2, 2010

(65) Prior Publication Data
US 2011/0240859 A1 Oct. 6, 2011

(51) Int. Cl.
*G01J 5/20* (2006.01)
*G01J 5/02* (2006.01)
(52) U.S. Cl. ..................................... 250/338.4; 250/340
(58) Field of Classification Search ............... 250/338.1, 250/338.4, 332, 208.1, 340
See application file for complete search history.

(56) References Cited

U.S. PATENT DOCUMENTS

| | | | |
|---|---|---|---|
| 4,694,185 A * | 9/1987 | Weiss | 250/208.1 |
| 6,690,014 B1 | 2/2004 | Gooch | |
| 6,956,213 B2 | 10/2005 | Antesberger | |
| 2007/0023661 A1 * | 2/2007 | Wagner et al. | 250/338.1 |

* cited by examiner

*Primary Examiner* — David Porta
*Assistant Examiner* — Faye Boosalis
(74) *Attorney, Agent, or Firm* — Richard J. Kim (57) ABSTRACT

An infrared imaging system including a substrate, a plurality of hexagonal shaped micro-bolometer pixels combined to define a focal plane array. Each pixel is electrically connected to the substrate with a pair of opposing isolation legs. One end of the isolation leg is attached to the pixel's periphery while the other is fixed to that substrate so that the focal plane array and a plane containing the substrate have a parallel, spaced-apart relationship. In this manner, the isolation legs provides an electrical communication path from each pixel to the substrate as each pixel undergoes an internal change in resistance due to absorption of infrared energy. At the same time, the legs separate the pixels from the substrate so that there is no heat transfer between the pixel and the substrate due to direct contact. The hexagonal shape arrangement also allows for a staggered arrangement of adjacent rows in the array, thereby increasing the fill factor for the focal plane array of the device. The addition of stepped areas to the hexagonal pixel provides for improved energy absorption through increase in area and multiple coupling of resonant cavities between the pixel and the substrate.

14 Claims, 10 Drawing Sheets

ALTERNATIVE PIXEL SHAPE FOR UNCOOLED MICRO-BOLOMETER

GOVERNMENT INTEREST

The invention described herein may be manufactured, used, sold, imported, and/or licensed by or for the Government of the United States of America.

FIELD OF THE INVENTION

The present invention relates in general to imaging devices, and more particularly, to infrared imaging devices.

BACKGROUND OF THE INVENTION

Known infrared imaging systems typically include a planar detector area, known as the focal plane array, which consists of a plurality of planar detector pixels on a planar substrate that typically includes a read-out integrated circuit. The pixels are thermally isolated from, but electrically connected to, the substrate by way of mechanical isolation legs. The pixels act as micro-bolometers, in that infrared energy from the scene changes the pixel temperature, which further changes the pixel resistance. For each pixel, the change in resistance across the isolation legs is detected, measured, and represented by support circuitry, both in the substrate and other support circuit boards, to generate an infrared image.

For most infrared imaging systems, there are several characteristics that are extremely desirable. Specifically, it is desired that the systems have the best sensitivity achievable. It is also desirable that the infrared images generated have a high resolution for any given field of view. It is also generally desirable that infrared imaging systems have a larger field of view if task-required resolution can be retained. The shape of the pixels, as well as the arrangement thereof within the focal plane array, can affect these attributes, in that a field of view increase requires an increase in the number of pixels in the focal plane array and their closer location to each other if resolution and performance are to be retained.

The focal plane array unit cell fill factor is the ratio of active absorption area to unit pixel cell size. Unit cell fill factor can influence how the detector pixels are arranged on the focal plane array and the number of pixels per unit area. Different pixel shapes and different pixel arrangements could increase the unit cell fill factor and also fill some of the non-imaging real estate of the focal plane array with active absorption area. Such arrangements would provide increased resolution for the imaging device, and would improve infrared imaging performance in micro-bolometer based systems using single or multiple layer pixel designs.

In known infrared devices, the micro-bolometer pixels usually have a rectangular planar absorption area and are arranged in straight, perpendicular rows and columns. Further, the isolation legs typically extend outwardly from the pixel perimeter for a single layer structure, or are folded under the absorption area in right angle traces for a multiple layer structure. The rectangular shape of the current pixel and isolation leg structure would not greatly benefit from a staggered pixel arrangement in terms of focal plane array fill percentage. Although a staggered row or column design might help infrared imaging system performance with rectangular pixels in terms of image sampling, it would be of further benefit to change the shape of the pixel and allow them to be placed more closely together on the focal plane array.

In some instances, it is desirable to have an increased field of view for the infrared imaging system, which could result in increased angles of incidence for the incoming infrared radiation energy from the scene depending on the system front end optics. Absorption, and therefore sensitivity, could be improved if the incoming radiation is as orthogonal as possible to the pixel surface.

Superimposed over these considerations is the fact that micro-bolometer pixels are coincident with spaced-apart parallel planes, which establishes a tuned resonant cavity for the wavelength of interest between the focal plane array and the substrate for the device. During operation, a portion of the incoming infrared radiation passes through the pixel absorption surface and reflects off of the substrate to be absorbed again by the pixel. If pixel shapes are changed, then the resonant cavity efficiency of operation could be changed accordingly and perhaps adversely.

One way to increase pixel absorption, especially at increased angles of incident radiation, would be to step the absorption surface area of each micro-bolometer pixel in one or both directions. A method of decreasing the distance between pixels on the focal plane array would be to maximize the unit cell fill factor and pursue alternative shapes to the current rectangles.

SUMMARY OF THE INVENTION

Accordingly, one object of the present disclosure is to provide infrared imaging device with pixels whose absorption area shapes allow for a different pixel arrangement on the substrate to create more densely packed focal plane arrays.

It is another object of the present disclosure to provide an infrared imaging device with a higher fill factor per unit area.

Another object of the present disclosure is to provide an infrared imaging device whose absorption surface shape improves the absorption of the device.

Yet another object of the present disclosure is to provide an infrared imaging device capable of maintaining sensitivity with an increased field of view.

Another object of the present disclosure is to provide an infrared imaging device that is relatively easy to manufacture in a cost-effective manner.

These and other objects of the invention are achieved in one aspect by an infrared imaging system comprising a substrate, a plurality of hexagonally shaped micro bolometer pixels that combine to define a focal plane array, and means for thermally isolating but electrically connecting the pixels to the substrate.

Another aspect of the disclosure involves a method for obtaining an infrared image comprising the steps of providing a plurality of micro-bolometer pixels, each of the pixels having an absorption surface with a hexagonal periphery, and electrically connecting each pixel to a substrate with an isolation leg having one end connected to the periphery and the other end connected to the substrate so that each pixel is spaced-apart from the substrate for isolation and the formation of a resonant cavity to improve absorption coupling.

The hexagonal shape arrangement allows for a staggered arrangement of adjacent rows in the array, thereby increasing the fill factor for the focal plane array of the device. The addition of stepped areas to the hexagonal pixel provides for improved energy absorption through increase in area and multiple coupling of resonant cavities between the pixel and the substrate.

Additional advantages and features will become apparent as the subject invention becomes better understood by reference to the following detailed description when considered in conjunction with the accompanying drawings wherein:

BRIEF DESCRIPTION OF THE DRAWINGS

In the detailed description that follows, identical components have been given the same reference numerals.

DETAILED DESCRIPTION

Figure 1:
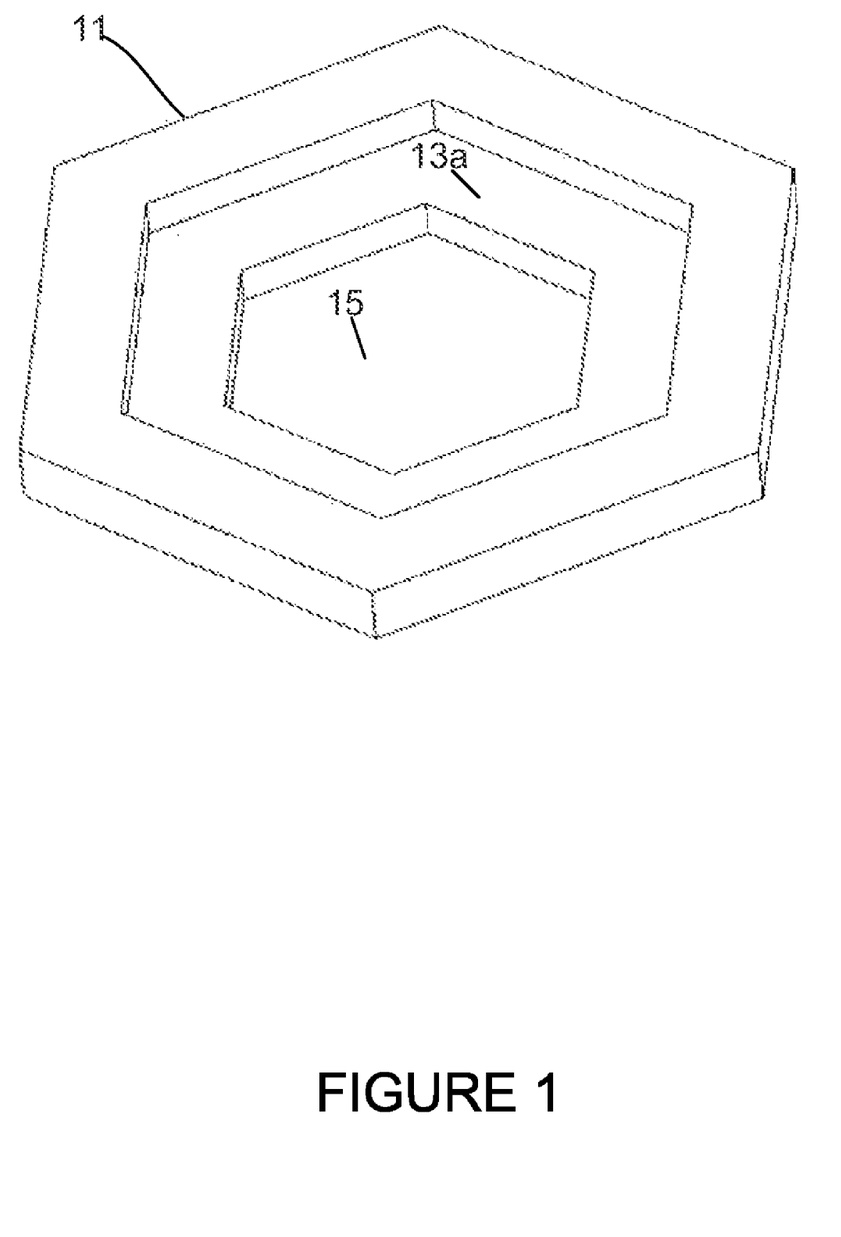
FIG. 1 is an exemplary enlarged isometric view of a single pixel.
Figure 2:
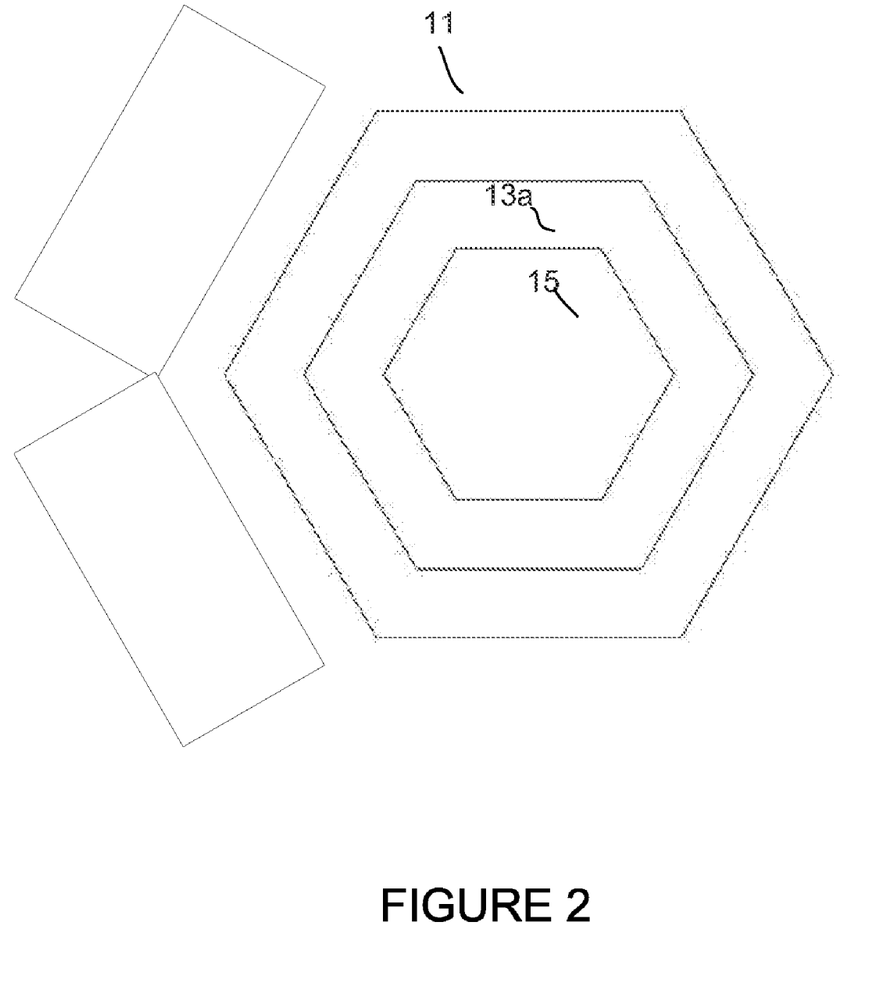
FIG. 2 is an exemplary top plan view of the pixel of FIG. 1.
Figure 3:
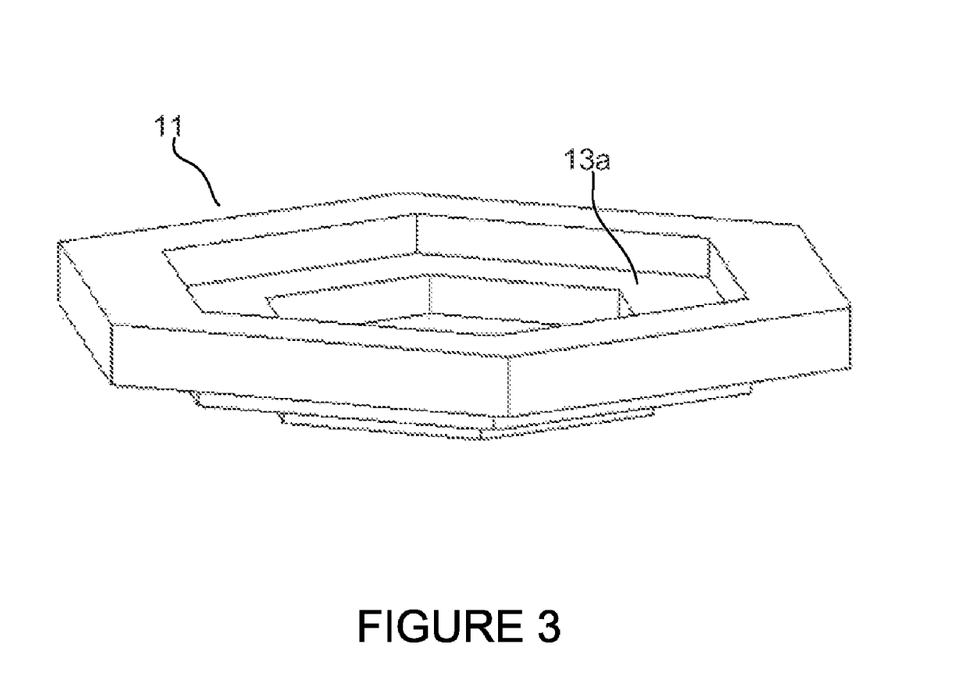
FIG. 3 is another isometric view of the pixel of FIG. 1.

Referring now to, FIGS. 1-3 show a single micro-bolometer pixel 11 for the infrared imaging device. The pixel 11 has a multiple layer stepped, concave shape defined by a plurality of hexagonal absorption surfaces 13 of which surface 13a in FIG. 1 is representative. The hexagonal absorption surfaces 13 are arranged around a central absorption surface 15 so that they are concentric when viewed in top plan (See FIG. 2), and so that the surfaces 13 are co-incident with respective planes that are parallel and spaced-apart from each other. With this configuration, any infrared energy, which passes through micro-bolometer pixel II, could be reflected and minimally diffused by the bottom of the pixel and produce constructive interference in the resonant cavity for further absorption. The stepped, or terraced, concave configuration provides the further advantage of increased efficiency for the pixel. Specifically, the various absorption surfaces have different dimensions allowing the pixel to be tuned for different infrared wavelengths corresponding to the geometry of the absorption surface. Additionally, the number of absorption surfaces could be varied from device to device, with increasing numbers of surfaces approaching a bowl shape. It is to be further appreciated that the infrared surface could also be convex as shown in FIG. 4 so that the cavity surface would extend away from the substrate if design considerations for the application warrant.

Figure 4:
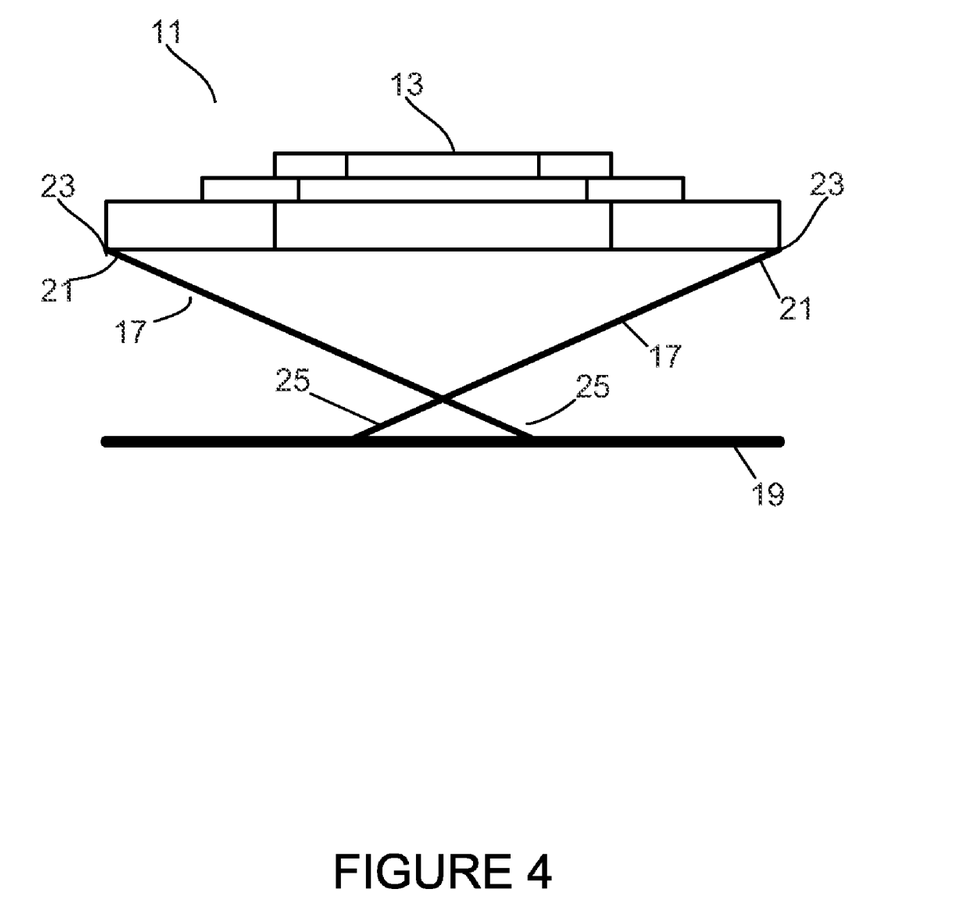
FIG. 4 is an exemplary side elevational view of a single pixel along with part of the substrate.
Figure 5:
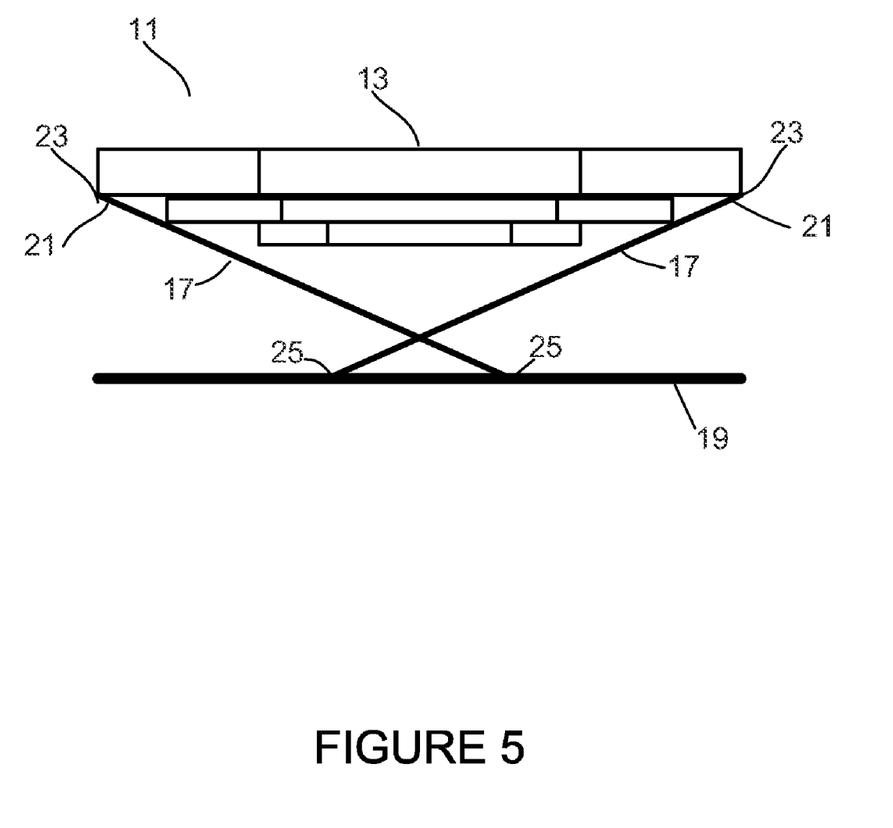
FIG. 5 is another exemplary side elevational view of a single pixel along with part of the substrate.
Figure 6:
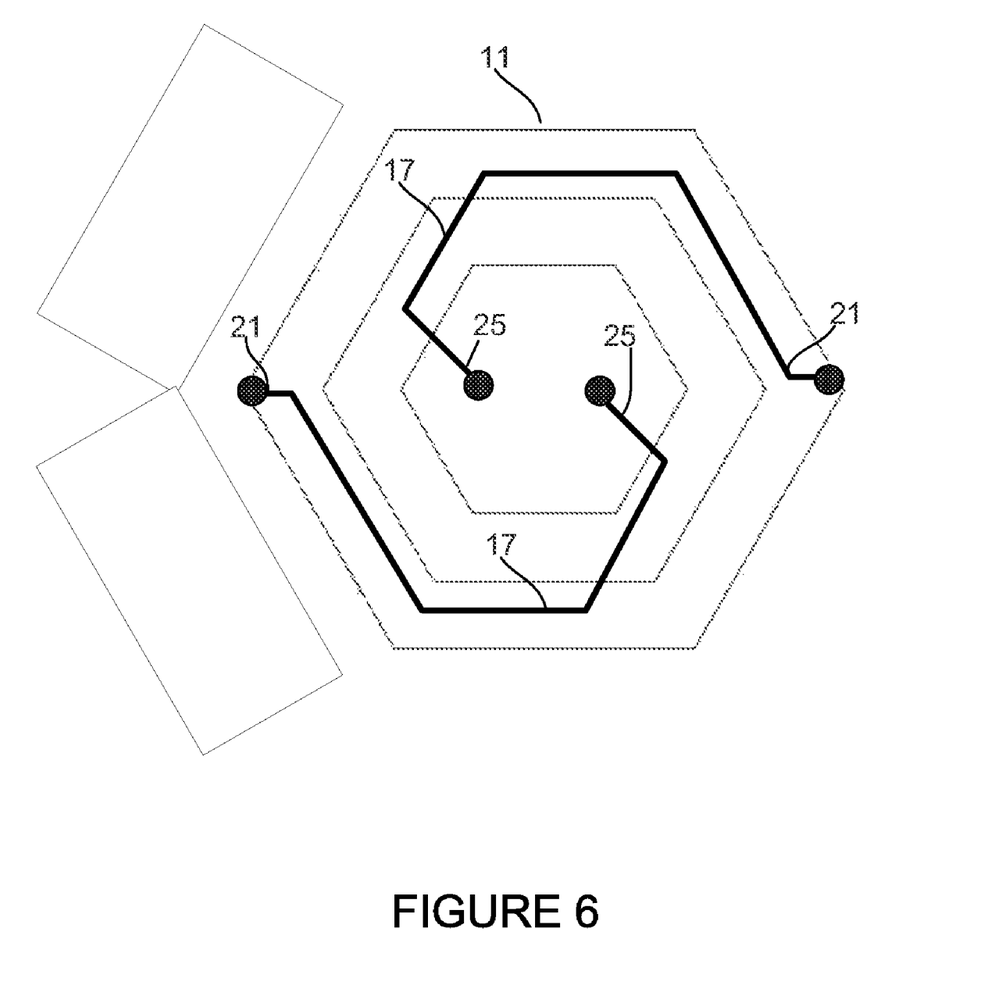
FIG. 6 is an exemplary bottom plan view of the pixel of FIG. 1.
Figure 7:
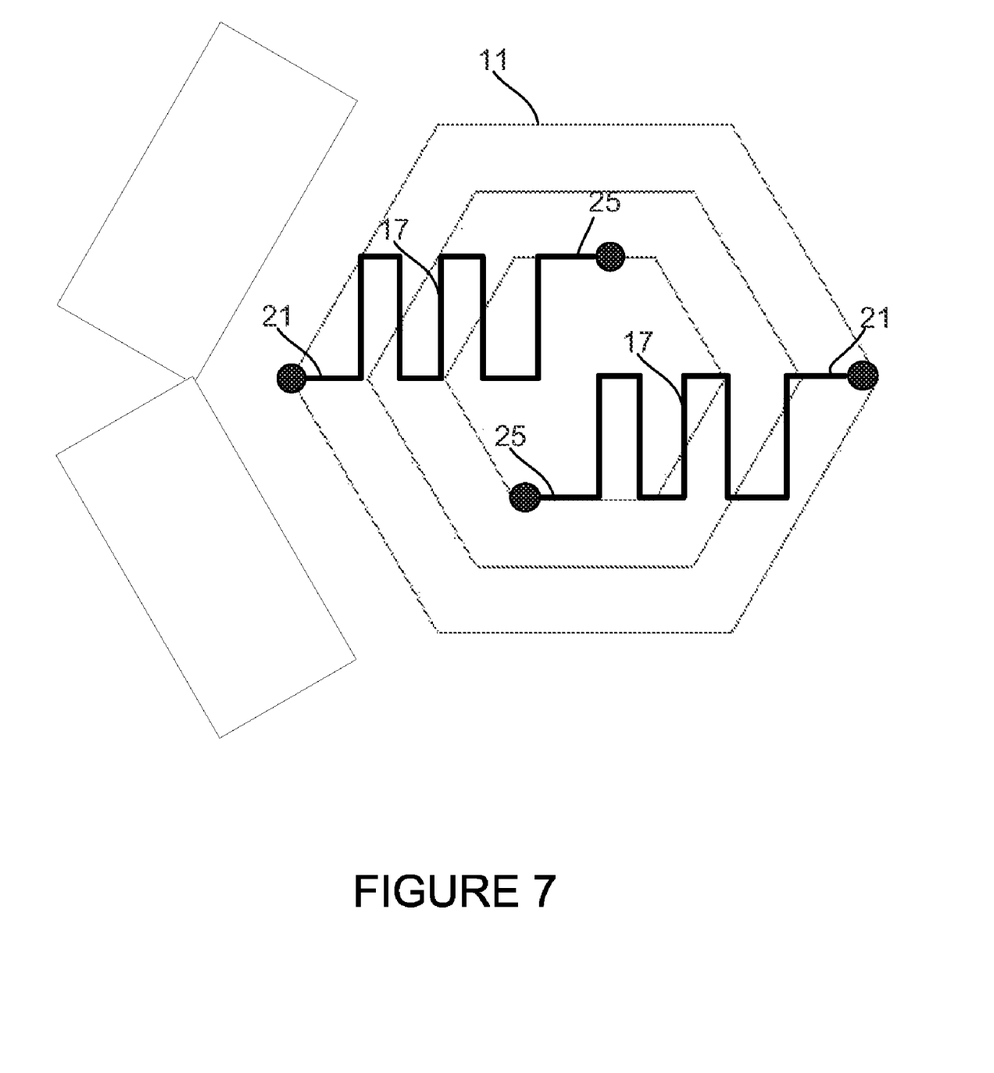
FIG. 7 is another exemplary bottom plan view of the pixel of FIG. 1.

Referring to the embodiments of FIGS. 4-7, a pair of isolation legs 17 interconnects each pixel 11 with a substrate 19. For example, FIG. 4 is an exemplary side elevational view of a single pixel along with part of the substrate in which the plurality of hexagonal absorption surfaces 13 are stepped up as multiple layers. Alternatively FIG. 5 is another exemplary side elevational view of a single pixel along with part of the substrate in which the plurality of hexagonal absorption surfaces 13 are stepped down as multiple layers. As variously exemplified in FIGS. 6 and 7, a periphery end 21 of each isolation leg 17 is connected to the periphery 23 of the pixel 11, while the opposing substrate end 25 is fixed to the substrate 19 under the pixel absorption area for maximum fill factor. FIG. 6 is an exemplary bottom plan view of the pixel of FIG. 1 in which each isolation leg 17 can have semi-spiraling bends. Alternatively, FIG. 7 is another exemplary bottom plan view of the pixel of FIG. 1 in which each isolation leg 17 can have a patterned rectilinear shape. Such variously exemplified isolation legs 17 can function as means for thermally isolating but electrically connecting the pixels to the substrate. Such means can somewhat thermally isolate the micro-bolometer pixel from the substrate, while at the same time providing an electrical path from the micro-bolometer pixel to the substrate when the pixel undergoes a change in resistance in response to detection of infrared energy. Stated differently, for each pixel, the pair of isolation legs establishes an electrical microcircuit between the pixel and the substrate.

Preferably, the pixel and isolation legs are an integral structure and are made from a silicon, silicon dioxide, vanadium oxide, or related material with a suitable thermal coefficient of resistance. The pixel is preferably manufactured with current manufacturing techniques, such as those used for manufacturing Micro Electro Mechanical Systems (MEMS), except that the masking patterns, lithography, and deposition steps would be slightly changed to yield the geometric shapes for the pixels and isolation legs discussed above. Any material used for manufacturing a known micro-bolometer pixel could also be appropriate for the pixel.

Figure 8:
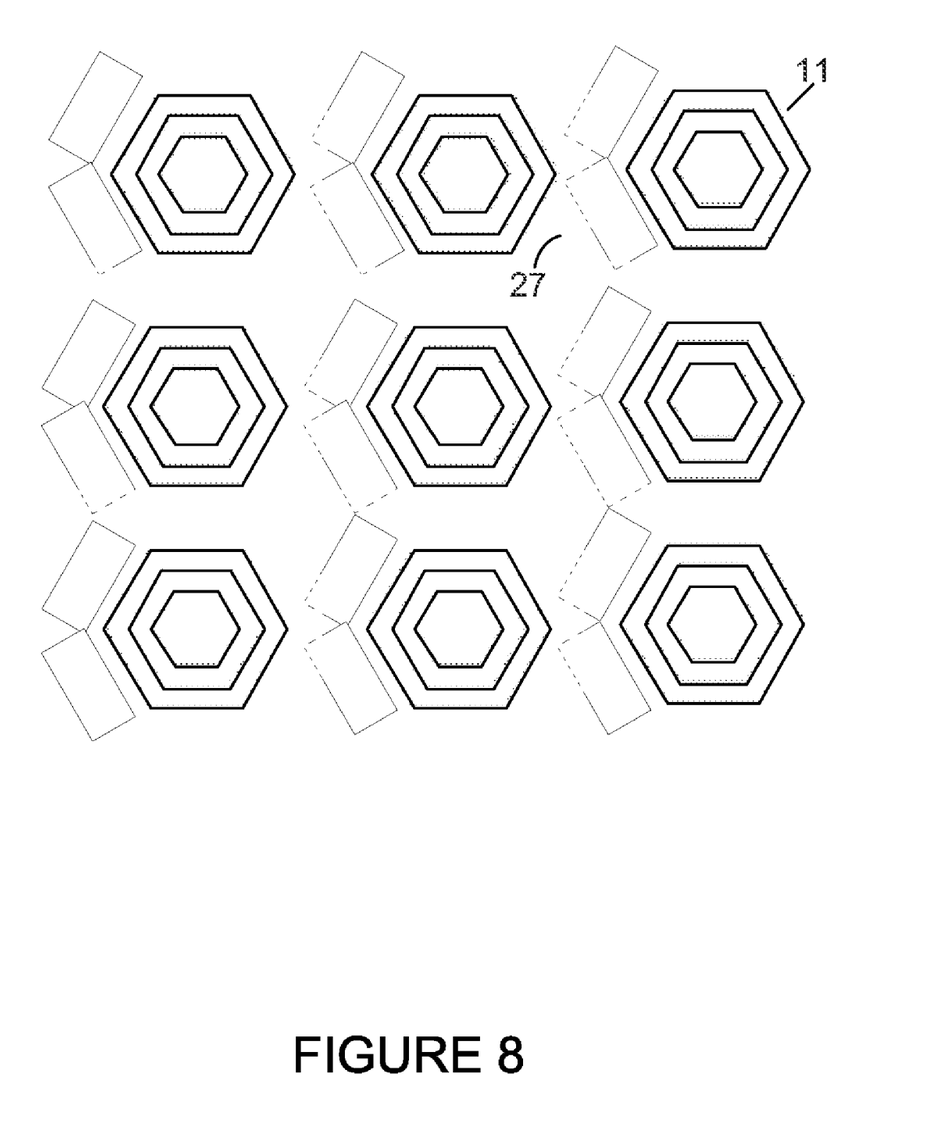
FIG. 8 is an exemplary enlarged top plan view of an arrangement of the pixels of FIG. 2 on a unit area of substrate.
Figure 9:
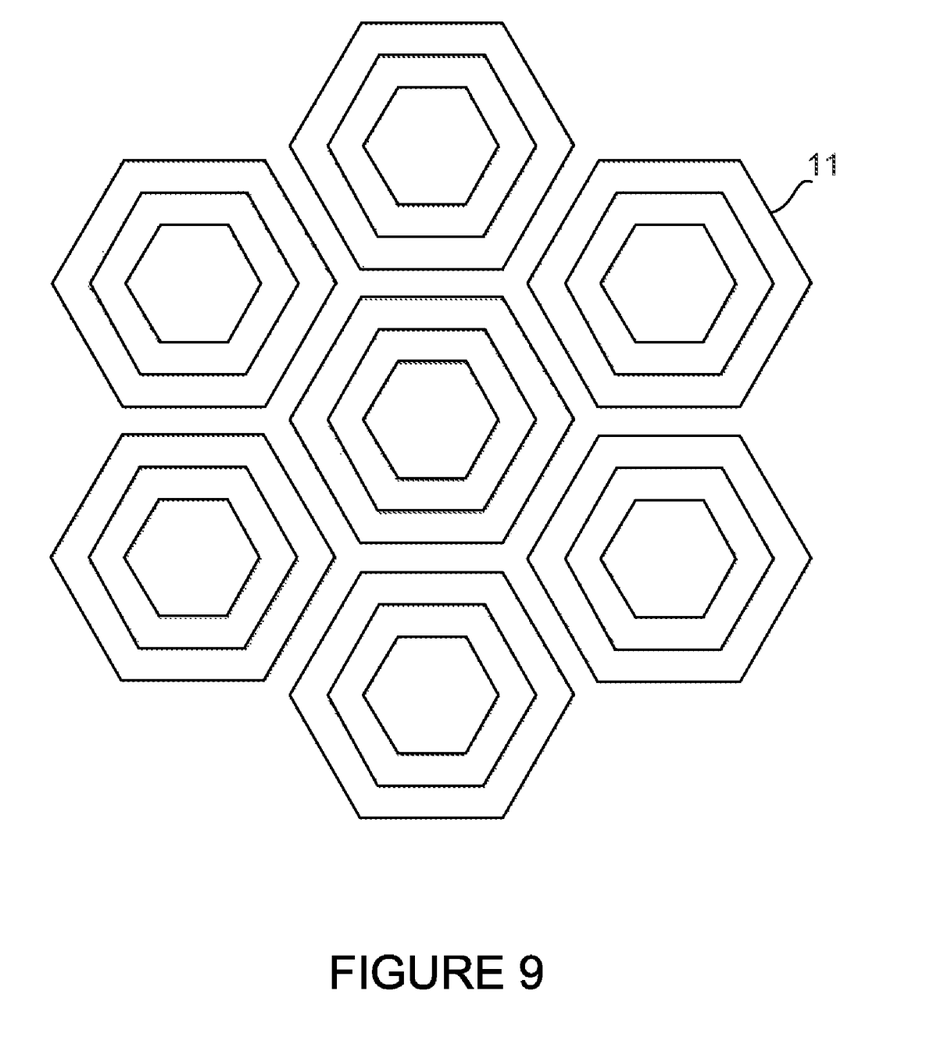
FIG. 9 is an exemplary enlarged top plan view of another arrangement of the pixels of FIG. 2 on a unit area of substrate.
Figure 10:
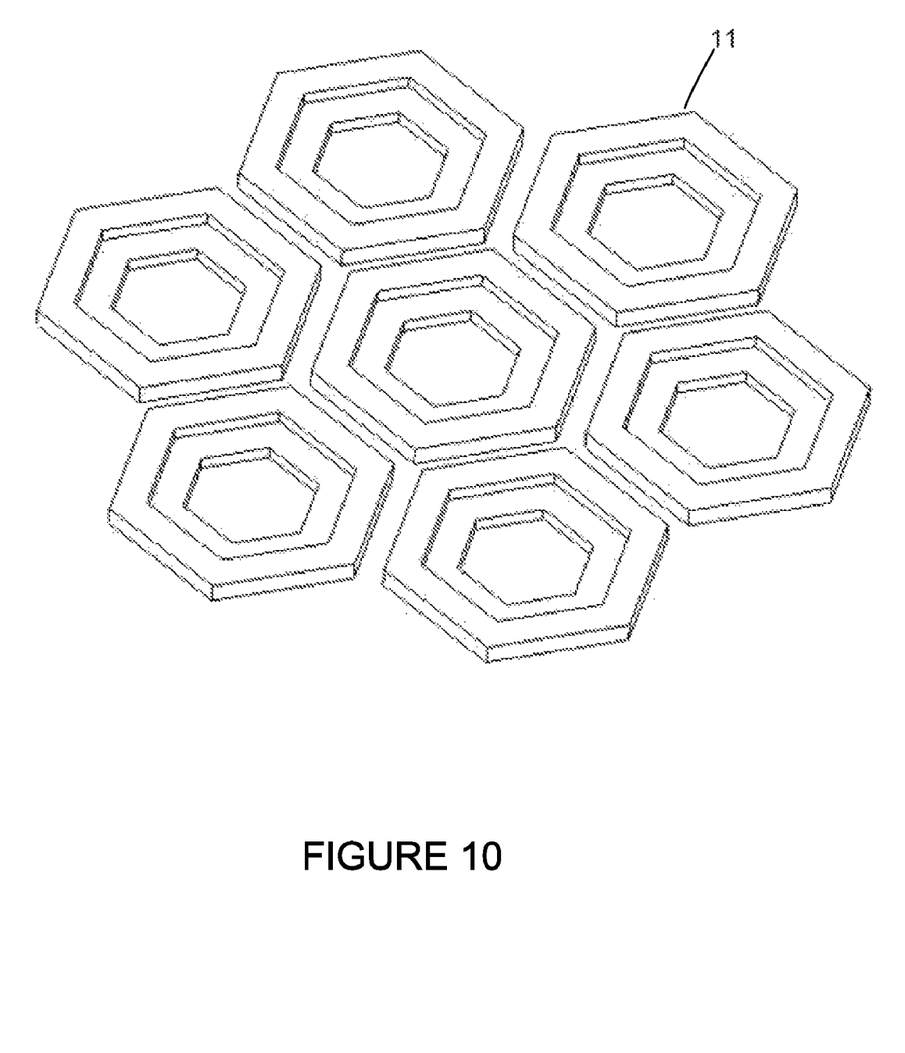
FIG. 10 is an exemplary enlarged isometric view of the arrangement of FIG. 9.

FIGS. 8-10 show a plurality of pixels 11 arranged on a unit area of substrate. In FIG. 8 (which is also representative of how pixels of known devices are arranged), the pixels 11 are arranged in rows, which are in alignment. This creates a plurality of "dead spots" (illustrated by reference character 27) in the focal plane array that do not receive any infrared energy from a scene (not shown). FIGS. 9 and 10 variously show other exemplary arrangements of a plurality of pixels for the present disclosure within the focal plane array. For example, FIG. 9 is an exemplary enlarged top plan view of a staggered pixel 11 arrangement on a unit area of substrate. FIG. 10 is an exemplary enlarged isometric view of such a staggered pixel 11 arrangement. Such staggered, or offset, arrangement of pixels 11 in adjacent rows allows pixels to be placed in most of the dead spots so that the size and number of dead spots 27 is minimized. The net result is an increased focal plane array fill factor, or the number of micro-bolometer pixels per unit area for the device, which further could provide an increased resolution of the system generated infrared image.

In the operation of the present disclosure, a plurality of pixels 11 is arranged in a focal plane array so that the pixels in adjacent rows are staggered, as shown in FIGS. 9 and 10. Infrared energy from a scene is received by the pixels 11 and thereby absorbed. In response, the affected micro-bolometer pixel(s) changes resistance according to the amount of infrared energy absorbed. Since each pixel 11 is actually a microcircuit resistor, the resistance change across the pixel is detected by read-only integrated circuits, which are placed in the substrate prior to the MEMS process in a manner known in the art. The read-only integrated circuit converts the change in resistance for each pixel into a proportional voltage for digitization and pixel non-uniformity correction, which is then formatted in a video signal for observation by the user.

It is obvious that many modifications and variations of the present invention are possible in light of the above teachings. It is therefore to be understood that within the scope of the appended claims, the invention may be practiced otherwise than as described.

What is claimed is:
1. An infrared imaging system comprising:
a substrate;

a plurality of hexagonally shaped micro-bolometer pixels that combine to define a focal plane array; and means for thermally isolating but electrically connecting the pixels to the substrate.

2. The system recited in claim 1 wherein the pixels have a planar absorption surface.

3. The system recited in claim 2 wherein the absorption surface is stepped.

4. The system recited in claim 2 wherein the absorption surface is stepped in a concave manner.

5. The system recited in claim 2 wherein the absorption surface is stepped in a convex manner.

6. The system recited in claim 1 wherein the pixels are arranged in a plurality of rows.

7. The system recited in claim 6 wherein the pixels in one row are offset from the pixels in an adjacent row.

8. The system recited in claim 1 wherein the thermally isolating but electrically connecting means includes a plurality of isolation legs.

9. The system recited in claim 8 wherein at least two isolation legs correspond to each pixel.

10. The system recited in claim 9 wherein each isolation leg has one end connected to a pixel.

11. The system recited in claim 10 wherein each isolation leg has another end connected to the substrate.

12. In an infrared imaging system, a hexagonally shaped micro-bolometer pixel having a planar stepped absorption surface.

13. A method for obtaining an infrared image comprising the steps of:

providing a plurality of micro-bolometer pixels, each of the pixels having an absorption surface with a hexagonal periphery; and electrically connecting each pixel to a substrate with an isolation leg having one end connected to the periphery and the other end connected to the substrate so that each pixel is spaced-apart from the substrate for isolation and the formation of a resonant cavity to improve absorption coupling.

14. The method recited in claim 13 including the step of:

arranging the pixels in a focal plane array having a plurality of pixel rows, the pixels in one row being offset from the pixels in an adjacent row.

\* \* \* \* \*